United States Patent
Nguyen et al.

(10) Patent No.: US 7,793,051 B1
(45) Date of Patent: Sep. 7, 2010

(54) GLOBAL SHARED MEMORY SUBSYSTEM

(75) Inventors: Tung M. Nguyen, Cupertino, CA (US); Andrew Spray, San Jose, CA (US); Jean-Christophe Hugly, Mountain View, CA (US); James M. Mott, Austin, TX (US)

(73) Assignee: Panta Systems, Inc., Santa Clara, CA (US)

( * ) Notice: Subject to any disclaimer, the term of this patent is extended or adjusted under 35 U.S.C. 154(b) by 552 days.

(21) Appl. No.: 11/714,384

(22) Filed: Mar. 5, 2007

(51) Int. Cl.
*G06F 12/00* (2006.01)

(52) U.S. Cl. .................. 711/147; 711/151; 711/152; 711/163

(58) Field of Classification Search .............. 711/141, 711/146–147, 151–153, 163
See application file for complete search history.

(56) References Cited

U.S. PATENT DOCUMENTS 6,986,005 B2 * 1/2006 Vo .............................. 711/152

* cited by examiner

*Primary Examiner*—Jasmine Song

(57) ABSTRACT

An embodiment of the present invention is directed to an apparatus for sharing memory among a plurality of compute nodes. The apparatus includes a memory, a plurality of interfaces for coupling the apparatus with the compute nodes, a switching fabric coupled with the interfaces, and a processor coupled with the switching fabric and the memory. The processor is operable to assign a portion of the memory to a particular compute node for exclusive access by the particular compute node.

21 Claims, 3 Drawing Sheets

GLOBAL SHARED MEMORY SUBSYSTEM

BACKGROUND

Over the years, as the interne has expanded and computers have multiplied, the need for clustered computing such as High Performance Computing (HPC) has increased. Clustered computing involves multiple compute nodes, usually a server grid, that work together to achieve a common task. For example, several (typically hundreds of) compute nodes may be clustered together to share the load of serving a high-traffic website. Traditionally, two different approaches have been used for allocating memory among the various compute nodes of a cluster.

The first approach involves physically installing a certain amount of memory in each node, or "brick." This approach results in several inefficiencies. For example, the memory in the bricks cannot be dynamically reallocated. Instead, if it is desired to change the amount of memory in a brick, an administrator must physically remove the brick from the cluster, open it, and add/remove memory from the brick. Because the memory cannot be dynamically reallocated, each particular brick will likely have to be over-provisioned to ensure optimal operation. Notwithstanding the ability to physically add memory to a particular compute node, the compute nodes nonetheless have a limited number of physical banks for holding memory modules. Thus, in order to meet their needs, some users are forced to pay huge markups for higher capacity memory chips. Moreover, since many cluster applications (e.g., data mining, web search, biometrics, etc.) have large, mostly read-only data sets, and in today's clusters there is a great deal of data duplication among the nodes, it may be desirable to share a read-only data set among the nodes. However, this is not possible when the memory is private to each node.

A second approach to memory allocation involves sharing a pool of memory among the compute nodes. This approach is often used when several processes are working on subdivisions of the same problem and they all see a single area of memory. In this approach, when one processor or a group of processors want to work on a separate task, a region of the memory may be designated for them, though the other processors are still able to see and access that space. It should be apparent therefore that this approach is not without its pitfalls as well. When multiple nodes are accessing the same area of memory, cache coherency becomes an overwhelming issue. Cache coherency arises because each CPU in the cluster has a cache. Since the data in a processor's cache corresponds to data in a memory, the cache therefore needs to be updated based on any changes to that corresponding space of memory. In other words, these types of systems are designed with the assumption that several CPUs are performing various tasks among themselves. In such a system, one node cannot guess whether it is permissible for it to transfer a piece of memory to one space without the other nodes' knowledge of the action. Thus, cache coherency must take place in that the processor making the change must notify the other processors in the cluster of the change. It follows then that valuable resources are wasted performing cache coherency operations.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An embodiment of the present invention is directed to an apparatus for sharing memory among a plurality of compute nodes. The apparatus includes a memory, a plurality of interfaces for coupling the apparatus with the compute nodes, a switching fabric coupled with the interfaces, and a processor coupled with the switching fabric and the memory. The processor is operable to assign a portion of the memory to a particular compute node for exclusive access by the particular compute node.

Thus, embodiments of the present invention provide technology for distributing a centralized memory resource to multiple compute nodes. By de-localizing the memory, the amount of memory allocated to individual compute nodes is no longer limited by memory chip size. Similarly, a compute node that requires a unusually large amount of memory can receive it without necessarily requiring more expensive, high-capacity memory modules. Moreover, by effectively providing a layer between the compute nodes and the physical memory, embodiments are able to partition out the memory so that one compute nodes cannot see or access the memory allocated to another. This not only adds an element of security to the memory, but also reduces or even eliminates the need for cache coherency between the compute nodes. Furthermore, the amount of memory allocated to a particular node can be dynamically reallocated without requiring additional chips to be physically installed in the node.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
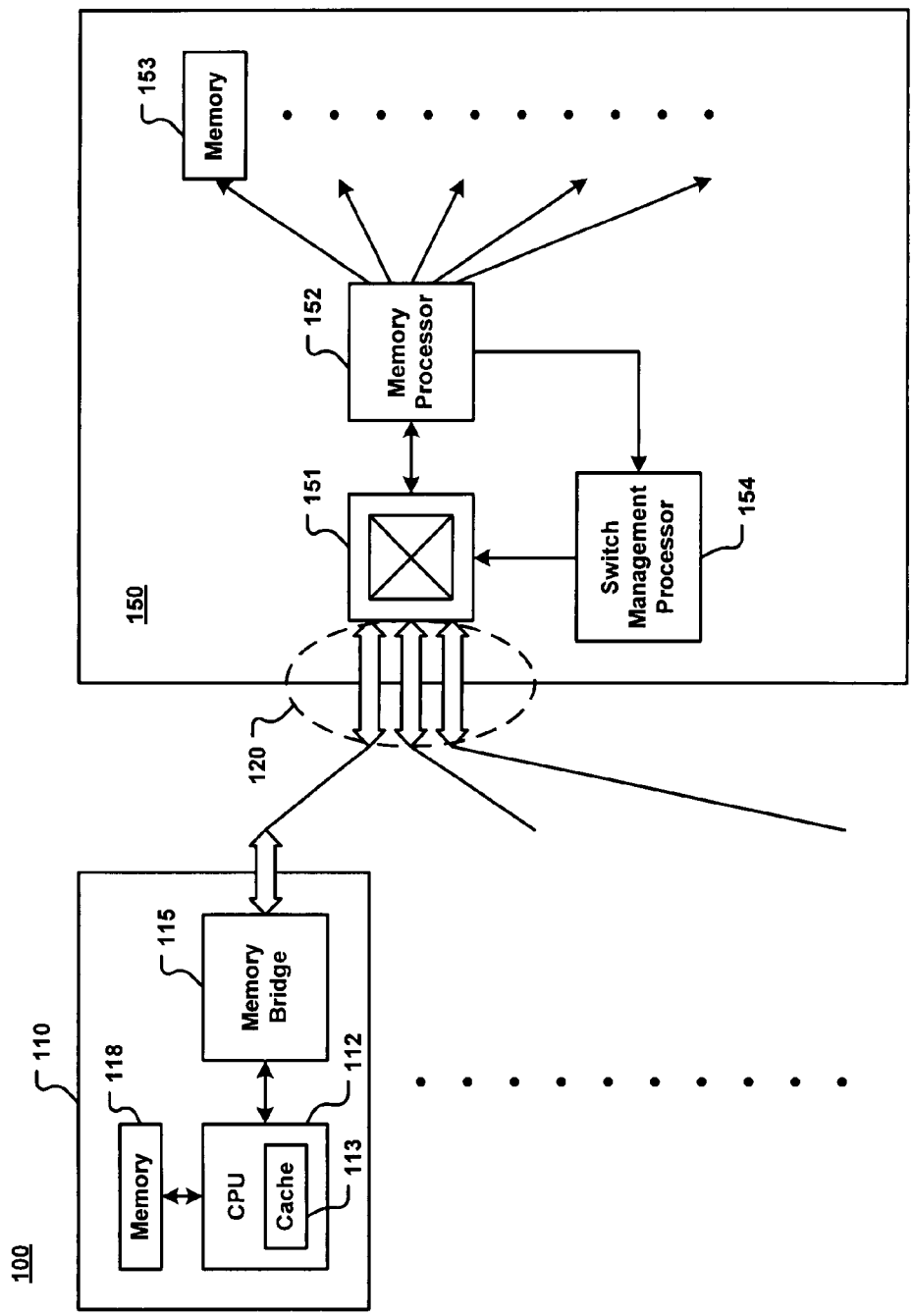
FIG. 1 illustrates a block diagram for a system for distributing memory, in accordance with various embodiments of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Generally speaking, embodiments provide technology for sharing centralized memory among a plurality of compute nodes. Because the memory is allocated from a global pool, it is no longer necessary to over-provision the memory since the memory with respect to each node can be dynamically reallocated as necessary. Moreover, embodiments are operable to distribute the memory such that each compute node sees the memory that is allocated to it, but not the remainder of the pool. As such, the nodes sharing in the same pool of memory do not have to consume themselves with the complex and time-consuming operations associated with cache coherency.

FIG. 1 illustrates a block diagram for a system 100, in accordance with various embodiments of the present invention. System 100 is well-suited for implementation in a rack or bladed server, for example. System 100 includes a plurality of compute nodes 110 (e.g., server blades). Compute nodes 110 each include a central processing unit 112, which has a cache 113. The compute nodes 110 may also have their own local memory 118, though it is not necessary.

System 100 also includes a shared memory apparatus 150. While only a single shared memory apparatus 150 is illustrated in FIG. 1, and embodiments may be described with respect to a single apparatus, it should be appreciated that embodiments may also be achieved which implement multiple shared memory apparatuses working in concert to share multiple pools of memory. The shared memory apparatus 150 includes a pool of memory modules 153. The shared memory apparatus 150 is able to support several different types of memory modules simultaneously. For instance, some of the modules may operate at 533 MHz, while other modules may operate at 400 MHz. Similarly the modules may operate at different clock latencies and have different capacities. In addition, the shared memory apparatus 150 may support FBDIMM, as well as legacy DIMM.

The shared memory apparatus 150 also includes a switching fabric 151 for switching memory accesses/requests corresponding to the memory 153 from the compute nodes 110. Accordingly, system 100 also includes an interface 120 for coupling the shared memory apparatus 150 with the compute nodes 110. For example, the shared memory apparatus 150 and the compute nodes 110 may be coupled via a backplane. In one embodiment, the shared memory apparatus 150 may also include a switch management processor 154 for controlling the switching fabric 151 (e.g., based on instructions from the memory processor 152) to switch memory requests and accesses from the compute nodes 110.

The shared memory apparatus 150 includes an intelligent memory processor 152 for performing various operations associated with the memory 153. For example, in one embodiment, the memory processor 152 is operable to analyze and the memory 153 and create a description thereof. The description may include, but is not limited to, the total amount of memory contained in the shared memory apparatus 150, the amount of memory 153 available for allocation, the amount of memory 153 currently allocated to other compute nodes, the speed(s) of the memory 153, whether any of the memory 153 is designated as globally shared, etc.

The memory processor 152 is also operable to process memory requests from the compute nodes 110. For example, the processor 152 may provide the description of the memory 153 to the compute nodes 110. The compute nodes 110 may then request an allocation of an amount of memory from the memory pool 153. The memory processor 152 may then, assuming sufficient memory is available, assign a portion of the memory 153 to the requesting compute node. In essence, a portion of the memory 153 may be "fenced off" for the requesting compute node. Moreover, the portion of memory allocated for a particular compute node need not be contiguous. For example, in one embodiment, the memory processor 152 may "virtualize" several noncontiguous portions of the memory 153 so that they appear as a single, contiguous segment to the requesting compute node. If the amount of requested memory is not currently available, the memory processor may then poll the other compute nodes to determine if any of them have been allocated more memory from the memory pool 153 than they currently require. If so, the memory processor 152 may then dynamically reallocate those excess allotments of memory in order to accommodate the new request.

In addition to simply specifying an amount of memory needed, the memory request from the compute nodes 110 may also specify other requirements. For example, the request may also be for either exclusive or shared access to the requested portion of memory. If exclusive access to the memory 153 is granted, then the other compute nodes will not be able to see that portion of the memory 153. If the request is for shared access, then the request may also specify whether that portion of the memory 153 is shared globally among all the other compute nodes or only a select few. It should be appreciated that if a compute node desires to share access to its allotment of memory, then some cache coherency may be required between the sharing nodes. However, if the compute node has exclusive access to the portion of the memory 153, or if the portion is shared on a read-only basis, then the cache coherency issue is eliminated. Once all the compute nodes 110 have been provisioned (i.e., the request/allocation cycle has been performed for all the compute nodes 110), the memory processor 152 may then periodically query the compute nodes 110 to reassess their memory needs and then reallocate the memory 153 as necessary.

The memory processor 152 may also perform other advanced operations with respect to the memory 153. The following discussion provides examples of such advanced operations. It should be appreciated that the memory processor 152 may be operable to perform many other operations not described and thus is not limited to those examples described herein.

In one embodiment, the memory processor 152 may allow for aliasing of address spaces within the memory 153. For example, a first compute node and a second compute node may both submit a request to "read address X." However, address X for the first compute node may actually map to address Y in memory 153, while address X for the second compute node may map to address Z in memory 153. Conversely, several different compute nodes may want to talk to the same physical space of memory 153, but each compute node might in fact have a different memory area to which it thinks it is talking. Thus, the memory processor 152 may be operable to create table, for example, defining which areas of the physical memory 153 correspond to certain ranges of memory as far as particular compute nodes 110 are concerned.

Because of the remote nature of the shared memory apparatus 150, certain memory operations that would normally be performed by the processors 112 local to the compute nodes 110 may also be "remoted" or farmed out to the memory processor 152. As a result, a degree of overhead is reduced for the compute node CPUs 112. Such operations include, but are not limited to, error recovery, fault containment, mirroring, cryptography, compression, DMA operations, lock management, searches, real-time clocks, etc. Because the memory processor 152 may perform certain operations on behalf of the CPUs 112, the memory processor 152 may also be operable to generate an interrupt when the task is completed or if an error is encountered. In one embodiment, the memory processor 152 is operable to perform mathematical and/or logical operations on vectors of the memory 153 on behalf of one of the compute nodes 110. For example, if a compute node wishes to brighten an image stored in the memory 153, the memory processor 152 can perform the task of adding the appropriate offset to the values of the image.

The memory processor 152 may also independently recognize patterns of memory requests. For example, when a particular compute node 110 accesses the memory 153, it may read 128 bytes, then skip 2 KB, then read another 128 bytes, and so on. In one embodiment, the memory processor 152 is operable to recognize a pattern such as this, thereby enabling it to prefetch from the memory 153 in that pattern, in anticipation of the next access.

Figure 2:
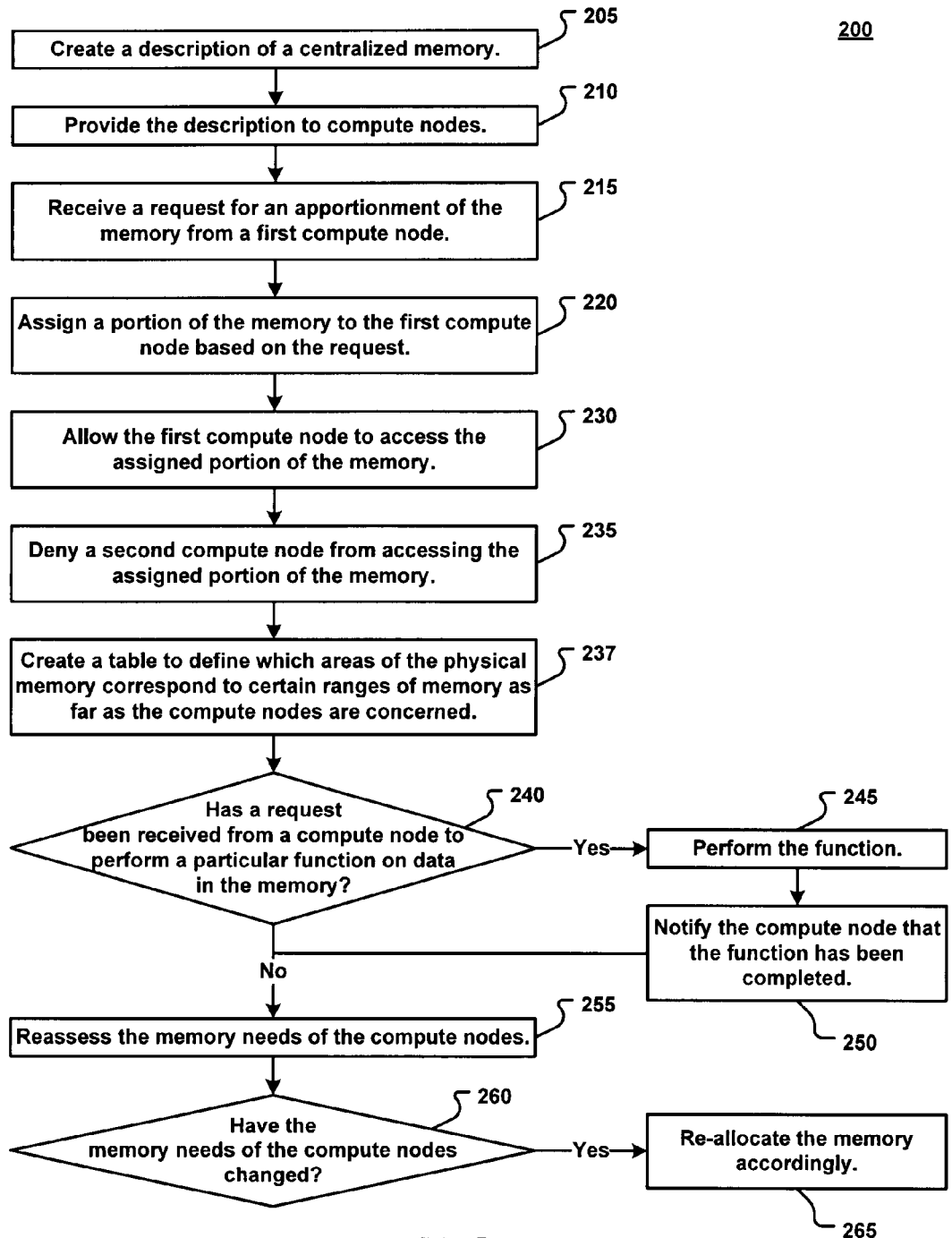
FIG. 2 illustrates a flowchart for a process for sharing a centralized memory among a plurality of compute nodes, in accordance with various embodiments of the present invention.

FIG. 2 illustrates a flowchart 200 for a process for sharing a centralized memory among a plurality of compute nodes, in accordance with various embodiments of the present invention. Flowchart 200 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that can be usable by a computing device. However, the computing device readable and executable instructions (or code) may reside in any type of computing device readable medium. Although specific operations are disclosed in flowchart 200, such operations are exemplary. Flowchart 200 may not include all of the operations illustrated by FIG. 2. Also, flowchart 200 may include various other operations and/or variations of the operations shown by FIG. 2. Likewise, the sequence of the operations of flowchart 200 can be modified. It is noted that the operations of flowchart 200 can be performed by software, by firmware, by electronic hardware, or by any combination thereof.

At block 205, a description of the centralized memory is created. The description may include, but is not limited to, the total amount of memory contained in the centralized memory, the amount of memory available for allocation, the amount of memory currently allocated to other compute nodes, the speed(s) of the memory, whether any of the memory is designated as globally shared, etc. Thereafter, the description is provided to the compute nodes (block 210).

At block 215, a request is received from a first compute node for an apportionment of the centralized memory. In addition to an amount, the request may also specify other desired attributes. For example, the request may also be for either exclusive or shared access to the requested portion of memory. If the request is for shared access, then the request may also specify whether that portion of the memory is shared globally among all the other compute nodes or only a select few.

Figure 3:
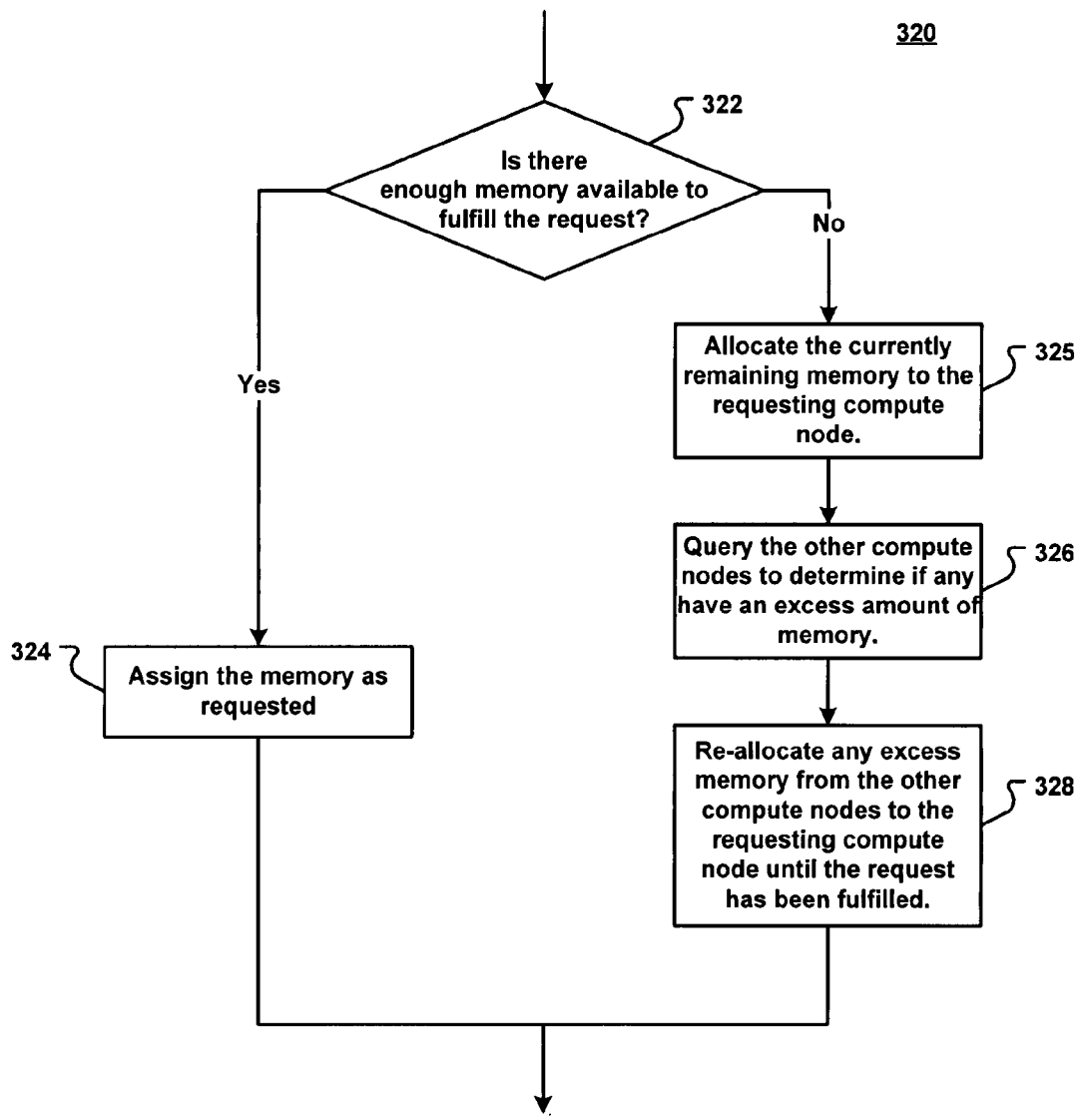
FIG. 3 illustrates a flowchart for assigning a portion of memory to a compute node based on a request, in accordance with an embodiment of the present invention.

At block 220, a portion of the memory is assigned to the first compute node based on the request. FIG. 3 illustrates a flowchart 320 for assigning a portion of memory to a compute node based on a request, in accordance with an embodiment of the present invention. Although specific operations are disclosed in flowchart 320, such operations are exemplary. Flowchart 320 may not include all of the operations illustrated by FIG. 3. Also, flowchart 320 may include various other operations and/or variations of the operations shown by FIG. 3. Likewise, the sequence of the operations of flowchart 320 can be modified.

At block 322, a determination is made as to whether there is enough memory currently available to fulfill the request. If yes, then the memory is simply assigned as requested (block 324). If there is not currently enough memory available, then the remaining memory is allocated to the requesting compute node (block 325). At block 326, the other compute nodes are then queried to determine if any of them are assigned more memory than they currently require (block 326). At step 328, the excess memory found is reallocated to the requesting compute node until the request has been fulfilled.

With reference again to FIG. 2, once the first compute node has been assigned a portion of the memory, the first compute node is then allowed to access the assigned portion of the memory (block 230). In one embodiment, a portion of the memory is thus "fenced off" for the requesting compute node. Thus, in one embodiment, other compute nodes (i.e., a second compute node) are denied access to the portion of memory allocated to the first compute node (block 235). It should be appreciated that if the assigned portion of memory is designated as globally shared, no denial of access is necessary. Moreover, the portion of memory allocated for a particular compute node need not be contiguous. In one embodiment, several noncontiguous portions of the memory may be virtualized so that they appear as a single, contiguous segment to the requesting compute node. Thus, a table may be created to define which areas of the physical memory correspond to certain ranges of memory as far as particular compute nodes are concerned (block 237).

In one embodiment, operations may be performed on data in the centralized memory on behalf of the compute nodes. By performing the operations for the compute nodes, instead of the compute nodes having to use their own CPU resources, the CPU overhead of the compute nodes can be greatly reduced. Such operations include, but are not limited to, error recovery, fault containment, mirroring, cryptography, compression, DMA operations, lock management, searches, real-time clocks, mathematical and logical operations, etc. Thus, at block 240, a determination is made as to whether a request has been received from a compute node to perform a particular function on data in the centralized memory. If yes, then the requested function is performed on behalf of the requesting compute node (block 245). In one embodiment, the compute node is notified (e.g., by generating an interrupt) that the function has been completed (block 250).

In one embodiment, the centralized memory may also be dynamically reallocated if necessary. Thus, at block 255, the memory needs of the compute nodes are reassessed. At block 260, a determination is made, based on the reassessment, as to whether the memory needs of the compute nodes have changed. If yes, then the centralized memory is reallocated accordingly (block 265).

Thus, embodiments of the present invention provide technology for distributing a centralized memory resource to multiple compute nodes. By de-localizing the memory, the amount of memory allocated to individual compute nodes is no longer limited by memory chip size. In other words, a compute node requiring 600 MB of memory can be allocated exactly 600 MB rather than, for instance, installing 512 MB and 128 MB chips locally. Similarly, a compute node that requires an unusually large amount of memory can receive it without necessarily requiring more expensive, high-capacity memory modules. Moreover, by effectively providing a layer between the compute nodes and the physical memory, embodiments are able to partition out the memory so that one compute node cannot see or access the memory allocated to another. This not only adds an element of security to the memory, but also reduces or even eliminates the need for cache coherency between the compute nodes. Furthermore, the amount of memory allocated to a particular node can be dynamically reallocated without requiring additional chips to be installed in the node.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for sharing memory among a plurality of compute nodes, comprising:
    a memory;
    a switching fabric coupled with said compute nodes; and
    a processor coupled with said switching fabric and said memory, said processor operable to assign a portion of said memory to a particular compute node for exclusive access by said particular compute node, said processor further operable to perform a function on data in said memory for said compute nodes, wherein said function is selected from the group consisting of error recovery, fault containment, data mirroring, cryptography, compression, a DMA operation, lock management, search, a mathematical operation, a logical operation, and managing a real-time clock.

2. The apparatus as recited in claim 1 further comprising:
    a switch management processor coupled with said switching fabric and operable to control said switching fabric to switch memory requests and accesses from said compute nodes.

3. The apparatus as recited in claim 1 wherein said memory comprises a first memory module and a second memory module, wherein further said first memory module operates at a different speed than said second memory module.

4. The apparatus as recited in claim 1 wherein said apparatus is physically separate from said compute nodes.

5. A system for sharing memory, comprising:
    a plurality of compute nodes;
    a shared memory apparatus coupled with said compute nodes, said shared memory apparatus comprising:
        memory;
        a switching fabric for switching memory accesses of said compute nodes; and
        a processor coupled with said switching fabric and said memory, said processor operable to assign a portion of said memory to a particular compute node for exclusive access by said particular compute node, said processor further operable to perform a function on data in said memory for said compute nodes, wherein said function is selected from the group consisting of error recovery, fault containment, data mirroring, cryptography, compression, a DMA operation, lock management, search, a mathematical operation, a logical operation, and managing a real-time clock; and
    an interface for coupling said shared memory apparatus with said compute nodes.

6. The system as recited in claim 5 wherein said compute nodes comprise processors, and wherein further said processors comprise caches.

7. The system as recited in claim 5 wherein said compute nodes comprise memory bridges for communicating with said shared memory apparatus via said interface.

8. The system as recited in claim 5 wherein said compute nodes are operable to read and write to said memory without performing cache coherency operations with each other.

9. The system as recited in claim 5 further comprising:
    a plurality of additional shared memory apparatuses, wherein said shared memory apparatus and said additional shared memory apparatuses are operable to collectively serve the memory needs of said compute nodes.

10. A method for sharing a centralized memory among a plurality of compute nodes, wherein said centralized memory is physically separate from said compute nodes, said method comprising:
    creating a description of said centralized memory;
    providing said description to said compute nodes;
    receiving a request for an apportionment of said centralized memory from a particular compute node;
    assigning a portion of said centralized memory for said particular compute node based on said request; and
    permitting said particular compute node to access said portion of said centralized memory, wherein said compute node uses said portion of said centralized memory as if it were local memory to said particular compute node; and
    performing a function in the background on data in said portion of said centralized memory for said particular compute node, wherein said function is selected from the group consisting of error recovery, fault containment, data mirroring, cryptography, compression, a DMA operation, lock management, search, a mathematical operation, a logical operation, and managing a real-time clock.

11. The method as recited in claim 10 wherein said portion of said centralized memory is accessible only by said particular compute node.

12. The method as recited in claim 10 wherein said request is for exclusive access to said apportionment.

13. The method as recited in claim 10 wherein said request is for shared access to said apportionment.

14. The method as recited in claim 13 wherein said request specifies which compute nodes are allowed to have shared access to said apportionment.

15. The method as recited in claim 10 further comprising:
notifying said particular compute node on said function has been completed.

16. The method as recited in claim 10 further comprising:
reallocating said centralized memory among said compute nodes based on a change in the memory needs of said compute nodes.

17. A system for sharing memory, comprising:
a plurality of compute nodes, the plurality of compute nodes each comprising a first memory, a central processing unit (CPU), and a memory bridge;
a shared memory apparatus coupled with said compute nodes, said shared memory apparatus comprising:
a second memory;
a switching fabric for switching memory accesses of said compute nodes; and
a processor coupled with said switching fabric and said second memory, said processor operable to assign a portion of said second memory to a particular compute node for exclusive access by said particular compute node, wherein said processor is operable to perform a function on data in said second memory for said compute nodes, and wherein said function is selected from the group consisting of error recovery, fault containment, data mirroring, cryptography, compression, a DMA operation, lock management, search, a mathematical operation, a logical operation, and managing a real-time clock; and
an interface for coupling said shared memory apparatus with said compute nodes.

18. The system as recited in claim 17 wherein said CPUs comprise caches.

19. The system as recited in claim 17 wherein said memory bridges communicate with said shared memory apparatus via said interface.

20. The system as recited in claim 17 wherein said compute nodes are operable to read and write to said second memory without performing cache coherency operations with each other.

21. The system as recited in claim 17 further comprising:
a plurality of additional shared memory apparatuses, wherein said shared memory apparatus and said additional shared memory apparatuses are operable to collectively serve the memory needs of said compute nodes.

* * * * *